United States Patent [19]

Ando et al.

[11] Patent Number: 4,743,526

[45] Date of Patent: May 10, 1988

[54] ALLOY HAVING VARIABLE SPECTRAL REFLECTANCE AND INFORMATION RECORDING MATERIAL MAKING USE OF THE SAME

[75] Inventors: Hisashi Ando; Tetsuro Minemura, both of Hitachi; Isao Ikuta, Iwaki; Yosimi Katou; Mituo Nakamura, both of Takahagi, all of Japan

[73] Assignee: Hitachi, Ltd., Tokyo, Japan

[21] Appl. No.: 803,640

[22] Filed: Dec. 2, 1985

[30] Foreign Application Priority Data

Dec. 3, 1984 [JP] Japan .................................. 59-255306

[51] Int. Cl.$^4$ ................................................. G03C 1/72
[52] U.S. Cl. .................................... 430/270; 430/945; 430/21; 430/19; 430/964
[58] Field of Search ................. 430/495, 270, 945, 21, 430/19, 964; 346/76 L, 135.1; 75/122.1, 123 R, 123 F, 126 R

[56] References Cited

FOREIGN PATENT DOCUMENTS 52084  5/1978  Japan .
140845 of 1982  Japan .

OTHER PUBLICATIONS

Chem. abstact 94(8)=55870e, 1980.
Chem. Abstract 98(6)=44256r, 1982.

Primary Examiner—Won H. Louie
Attorney, Agent, or Firm—Antonelli, Terry & Wands

[57] ABSTRACT

An alloy having variable spectral reflectance having a composition which essentially consists of Ag, 30 to 46 wt % of Zn and 0.1 to 15 wt % in total of at least one element selected from elements of groups Ia, IIa, Iva, Va, VIa, VIIa, VIII, Ib to Vb and rare earth elements, the alloy being able to have different crystal structures, one of which is obtained when it is held in solid state at a first temperature above the room temperature, another of which is obtained when the same is held in the solid state at a second temperture lower than said first temperature. Disclosed also is an information recording medium made of the alloy. The alloy exhibits a reversible change in color or spectral reflectance as a result of change between two crystal phases, so that the information recording medium produced from this alloy can be used effectively as the medium for recording, regeneration and erasion of the informations.

8 Claims, 12 Drawing Sheets

ALLOY HAVING VARIABLE SPECTRAL REFLECTANCE AND INFORMATION RECORDING MATERIAL MAKING USE OF THE SAME

BACKGROUND OF THE INVENTION

1. Field of the Invention

The present invention relates to a novel alloy having a variable spectral reflectance and an information recording material making use of the alloy.

More particularly, the invention is concerned with an alloy the crystal structure of which is varied in response to a light or heat energy applied thereto, resulting in a spectral reflectance variation which is utilized for various purposes such as recording of information, displaying and sensors.

2. Description of the Prior Art

In recent years, various methods have been developed for the recording and regenerating of informations, in view of the demand for higher recording density and current trend for digital recording. Among these systems, a system called optical recording disk system, which makes use of energy of laser beam for recording, erasing and regeneration of information, is considered as being promising because it offers a higher recording density than the conventionally used magnetic disks. A regeneration device which makes use of laser beam has been already put into practical use as a compact disk (CD) system. On the other hand, the recordable systems are broadly sorted into two types: namely, write-once type and reloadable type. The former type permits the writing of information only once, and is not capable of erasing the written informations. On the other hand, the later type allows repetitional recording and erasing. In the write-once type recording system, the recording portion of the recording medium is destroyed or deformed in such a manner as to form convexities and concavities by the energy of the laser beam applied thereto, and the regeneration of the information is conducted by detecting a change in the rate of the reflected laser beam caused by interference due to presence of the convexities and concavities. Usually, the recording medium of the write-once type is made of tellurium (Te) and its alloys. When such a material is used, the convexities and concavities and are formed by making use of melting and sublimination of the alloy by the energy of the laser beam. This type of medium, however, involves a problem concerning toxicity.

The reloadable system usually employs an optomagnetic material as the material of the recording medium. In this type of system, the recording is conducted by making use of magnetic anisotropy which occurs when the material is heated by light energy to a temperature around the Curie point. The regeneration of the information is carried out by detecting a difference in polarization angle caused due to both the magnetic Faraday effect of polarized incident light in the recording medium and magnetic force effect. This system is considered as being most promising, and intense studies have been made to put this system into practical use within several years. Unfortunately, however, no material is available which would provide sufficiently large difference in the polarization angle. Although various proposals have been made such as a multi-layer film, such proposals still further from problems of small S/N and C/N ratios. Another known reloadable type system makes use of the change of reflectance occurring due to a reversible phase change of the recording medium between amorphous structure and crystal structure. That is, the recording and reproduction is conducted by making use of a change in the reflectance which is caused by a reversible phase change between the amorphous and crystalline states of the material. An example of the materials suitable for use in this type of system is an alloy which is prepared by adding small amounts of germanium (Ge) and tin (Se) to tellurium oxides (TeO$_x$). This system, however, suffers from a problem in that the stability of the phase at room temperature is low due to a low crystallization temperature of the amorphous phase, resulting in an inferior reliability of the disk.

In another example of the system which makes use of the reversible phase change, the recording and regeneration are conducted by means of a change in the color tone which is caused by a phase change between two crystalline states. This system utilizes, for example, an alloy which is disclosed in Japanese Unexamined Patent Publication No. 140845/1982. More specifically, this alloy has a composition which essentially consists of 12 to 15 wt % of Al, 1 to 5 wt % of Ni and the balance substantially Cu, and exhibits a change in the color from red to gold when the temperature thereof varies across the martensite transformation temperature. The martensite transformation is caused without fail when the temperature comes down. Therefore, the color which is obtained when the material is held at a temperature above the martensite transformation temperature cannot be maintained when the temperature has come down below the martensite transformation temperature. Conversely, the color which is obtained when the material temperature is below the martensite transformation temperature is changed to another color when the material is heated to a temperature above this transformation temperature. It is possible to record information by causing a local change of color in the recording medium.

SUMMARY OF THE INVENTION

Object of the Invention

An object of the invention is to provide an alloy having a variable spectral reflectance which is capable of maintaining local difference of spectral reflectance at an identical temperature, as well as an information recording material making use of the alloy.

To this end, according to the invention, there is provided an alloy having variable spectral reflectance having a composition which essentially consists of 30 to 46 wt % of Zn, 0.1 to 15 wt % in total of at least one element selected from elements consisting of groups Ia, IIa, IVa, Va, VIa, VIIa, VIII, Ib to Vb and rare earth elements, and the balance Ag and incidental impurities.

The alloy in accordance with the invention is characterized in that the crystal structure obtained when the alloy in the solid state is held at a first temperature (high temperature) above the room temperature is different from that obtained when the alloy is held at a temperature (low temperature) below the first temperature.

The alloy in accordance with the invention can have at least two different spectral reflectances at an identical temperature and can reversibly change its spectral reflectance through a battery followed by cooling.

In other words, the alloy in accordance with the invention in solid state can have different phases of different crystalline structures at at least two different temperature regions. The alloy heated to a high temperature phase and quenched therefrom exhibits a spectral reflectance different from a spectral reflectance thereof obtained by non-quenching cooling. It is, therefore, possible to reversibly change the spectral reflectance by alternatingly effecting a heating and quenching to and from a high temperature and another heating and cooling to and from a low temperature.

DESCRIPTION OF THE PREFERRED EMBODIMENTS

Figure 1:
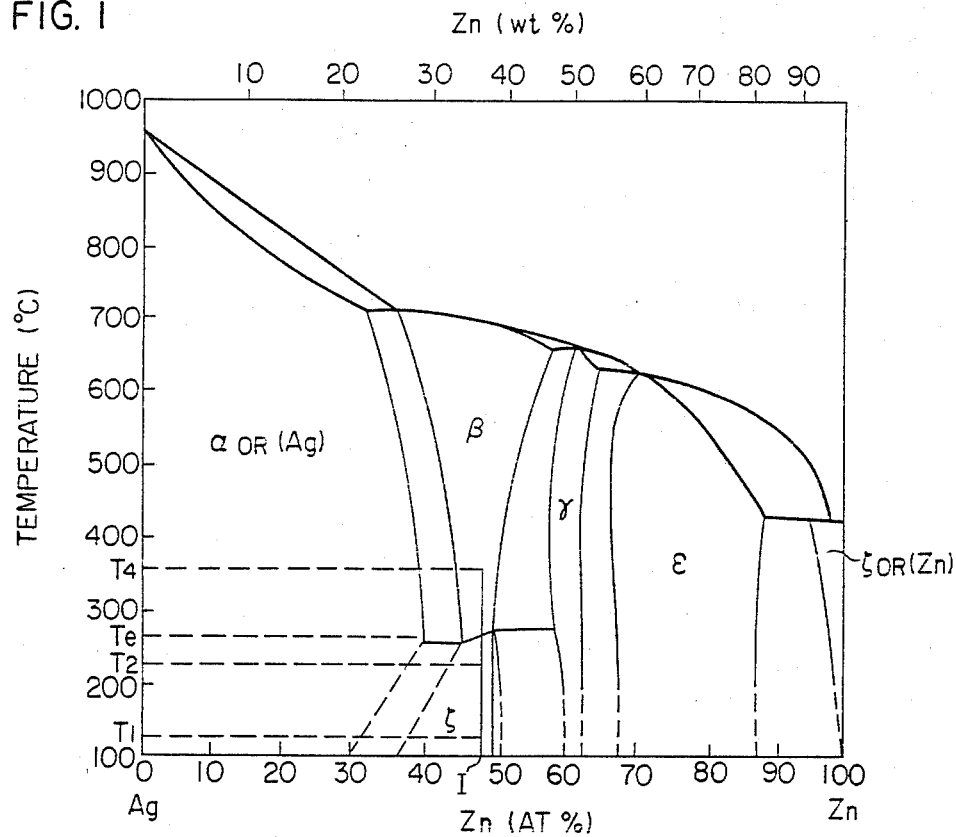
FIG. 1 is a binary equilibrium diagram of an Ag-Zn alloy system.
Figure 2:
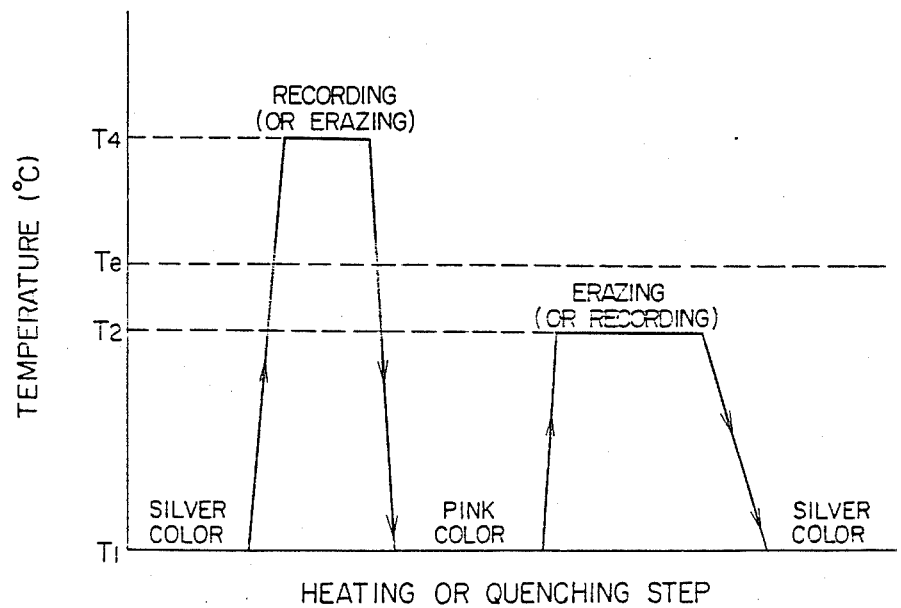
FIG. 2 is an illustration of the principle of recording by heating and quenching, as well as the principle of erasing, conducted on an alloy in accordance with the invention.

The principle of reversible change of spectral reflectance in the alloy of the invention will be explained hereinunder with reference to FIG. 1 which is an equilibrium diagram of an Ag-Zn system alloy. An explanation will also be made as to the principle of recording and erasing of information such as signal, letter or pattern, with specific reference to FIG. 2.

The explanation will be made with specific reference to the alloy having the composition (I) shown in FIG. 1. This alloy exhibits $\zeta$ phase in the equilibrium state. This phase exhibits silver color and the spectral reflectance thereof exhibits the curve which corresponds to this color. When this alloy is quenched after it is heated up to a temperature $T_4$ where the $\beta$ phase as the high-temperature phase is stable, the $\beta$ phase is supercooled to become $\beta'$ phase having a regular crystalline structure. This supercooled alloy exhibits pink color and the spectral reflectance of the alloy in this state is remarkably different from that exhibited by the $\zeta$ phase. When the alloy is heated at a temperature $T_2$ in which the $\zeta$ phase is stable, i.e., at a temperature not more than Te, the $\beta'$ phase is changed again to the $\zeta$ phase. In consequence, the color tone is changed from pink to original silver color and the original spectral reflectance is resumed, thus attaining a reversible change. After these steps, it is possible to repeat the reversible change. It is, therefore, possible to record, regenerate and erase the information by making use of the reversible change in color which is realized by repeating the above-described process. Thus, the alloy of the invention can be used as a recording medium which performs recording and regeneration of information by making use of reversible changes in the reflectance or color tone caused by a phase transition between different crystal phases of the alloy.

The regeneration temperature $T_1$ is usually a room temperature. The alloy of $\zeta$ phase exhibits silver color when it is held in the equilibrium state at the temperature $T_1$. If the alloy is locally heated by an energy up to the temperature $T_4$ and then quenched, the portion of this alloy changes its phase into $\beta$ phase and its color into pink. The recording of the information is thus conducted. The regeneration is possible by comparing this locally changed portion with other portions of the alloy.

When the locally changed pink color portion is heated to the temperature $T_2$ by energy of density different from that used for the recording followed by quenching, the $\beta'$ phase is changed to $\zeta$ phase and the color also is changed from pink to silver, thus accomplishing the erasing of the information. The process for recording, regeneration and erasing described above may be conducted in a reverse manner. Namely, the recording can be made by preparing the alloy of the $\beta'$ phase pink in color and causing a local change of color from pink into silver color by making use of $\beta'$ to $\zeta$ transformation. The regeneration is conducted by comparing this silver color from the pink background, and erasing is made by causing a phase change from the $\zeta$ phase to the $\beta$ phase.

The energy for recording and erasing can be suitably applied in the form of electromagnetic wave. Practical examples of such electromagnetic waves are various laser beams and electron beams. The regeneration may be conducted by using light of any wavelength which can provide appreciable difference in the spectral reflectance between the portions of different phases. Thus, light beams from a laser or a lamp of any wavelength from ultraviolet to infrared can be used suitable as the regeneration light beam. The material of the invention can be used also as a display unit, because it can visually exhibits the information by way of change in color.

Alloy Composition

The alloy in accordance with the invention can have different crystal structures at high and low temperatures. The crystal structure of the high-temperature $\beta$ phase can be maintained when this high-temperature phase is quenched from the high temperature to the low temperature.

The phase formed and maintained as a result of the quenching can be changed into the low-temperature phase when the alloy is heated at a preselected temperature. In order to enable such phase change, the alloy is required to contain 30 to 46 wt % of Zn. Preferably, the element or elements in the groups Ia, IIa, IVa, Va, VIa, VIIa, VIII, Ib, IIb, IIIb, IVb, Vb and rare earth elements are selected from the following elements: group Ia being Li; group IIa Mg, and Ca; group IVa Ti, Zr and Hf; group Va V, Nb and Ta; group VIa Cr, Mo and W; group VIIa Mn; group VIII Co, Rh, Ir, Fe, Ru, Os, Ni, Pd and Pt; group Ib Cu and Au; group IIb Cd; group IIIb B, Al, Ga and In; group IVb C, Si, Ge, Sn and Pd; group Vb P, Sb, Bi; rare earth element Y, La, Ce, Sm, Gd, Tb, Dy and Lu. The element or elements selected from these groups effectively lowers the temperature $T_2$ at which the phase is changed from $\beta'$ phase to $\zeta$ phase and, hence, reduces the heat input required for erasing.

Examples of the alloy suitable for use in the invention are as follows:

(i) An alloy having variable spectral reflectance consisting of 30 to 46 wt % of Zn, not greater than 10 wt % of In, and the balance Ag and incidental impurities;

(ii) An alloy having variable spectral reflectance consisting of 30 to 46 wt % of Zn 0.5 to 2.0 wt % of Cu, and the balance Ag and incidental impurities;

(iii) An alloy having variable spectral reflectance consisting of 30 to 46 wt % of Zn, 0.5 to 8.0 wt % of Sm and the balance Ag and incidental impurities; and (iv) An alloy having variable spectral reflectance consisting of 30 to 46 wt % of Zn, 0.1 to 3.0 wt % of Ga and the balance Ag and incidental impurities.

When In is contained, the most preferable range of In is between 1.5 and 7.5 wt %.

In order to obtain the variability of the spectral reflectance, it is necessary that an alloy be capable of forming an supercooled phase when quenched after heating. The alloy of the invention well meets this requisite.

For attaining a high speed of production and recording of information, the material is preferably a non-bulk material which has a small heat capacity and, hence, high response to heating and quenching. More specifically, the material is such a non-bulk material that, when an energy is applied to a preselected limited area of the material, the crystal structure of the material is changed from the original crystal structure into a different crystal structure over the full depth of the material substantially only in the limited area to which the energy is applied. In order that information can be stored at a high density in the limited area, the material preferably is of a non-bulk form having small heat capacity, such as foil, film, thin wire or powder. When the information density such as 20 Mega bits/cm$^2$ is required, it is preferable that the recoreding material has a recording film thickness of 0.01 to 0.2 $\mu$m. In general, plastic working of intermetallic compounds is difficult in operation. Therefore, the foil, film, thin wire or powder of the alloy is produced by directly quenching and solidifying the alloy material from the vapor phase or liquid phase into the desired form. This can be carried out effectively by PVD method (evaporation, spattering and etc.), CVD method, melt quenching method in which the melt of the alloy is poured onto the peripheral surface of a rotating roll of a metal having a high heat conductivity, electroplating method, chemical plating, etc. When the materials are used in the form of a film or powder, the material is directly formed on or applied-and-bonded to a substrate. Any binder which is used for applying the material to the substrate should not react with the material when the material is heated. It is effective to coat the film or powder layer having been formed on the substrate, by a suitable coating material for the purpose of preventing oxidation of the material.

The foil or thin wire is preferably formed by melt-quenching method to have a thickness or diameter not greater than 0.1 mm. For forming the foil or thin wire of a crystal grain size of not greater than 0.1 $\mu$m, the film or the powder should have a thickness or diameter of not greater than 0.05 mm.

The powder is preferably formed by gas atomizing method in which the melt of the material is jetted together with a liquid refrigerant into water thus quenching the melt. Preferably, the powder has a grain size not greater than 0.1 mm and, more preferably, has an ultrafine size of not greater than 1 $\mu$m.

The film can be formed by evaporation, sputtering, CVD, electroplating or chemical plating as explained before. Sputtering is used most effectively for forming a film of a thickness not greater than 0.1 $\mu$m. The sputtering permits an easy control of the alloy composition to be obtained.

It is also advisable that the film is divided into sections substantially in the same degree as the memory unit, by chemical etching.

Structure

The alloy of the invention has different crystal structures at high and low temperature regions, and can maintain the high-temperature phase or structure even at the low temperature, provided that the alloy is quenched from a high temperature.

Preferably, the alloy of the invention has such a feature that, although the crystal structure is irregular at the high-temperature region, the supercooled phase takes the form of an intermetallic compound having a regular lattice of, for example, Cs-Cl type or DO$_3$ type.

For attaining a large change in optical characteristics, the alloy of the invention is preferably of the type which is mainly constituted by the intermetallic compound mentioned above, and such a composition is most preferred that the whole alloy forms an intermetallic compound. The intermetallic compound is generally referred to as electron compound which preferably has a composition approximating b 3/2 electron compound in which the mean outer shell electron density e/a is 3/2.

It is also preferred that the alloy of the invention has an alloy composition capable of making a solid-phase transformation. Such alloy exhibits a large difference of the spectral reflectance depending on whether it is quenched or non-quenched from the high temperature. It is preferred that the alloy in accordance with the invention has ultra-fine crystal grains smaller than the value of wavelength of visible rays, while the crystal grains smaller than the wavelength of the semiconductor laser is used satisfactorily. More practically, the crystal grain size is not greater than 0.1 $\mu$m.

Properties

The alloy and recording material of the invention having variable spectral reflectance has such an essential feature that it can have at least two different values of spectral reflectance in the visible ray region at an identical temperature. Namely, the spectral reflectance of the crystal structure which is obtained by quenching from a high temperature to a low temperature is different from the spectral reflectance of the crystal structure which is formed by non-quenching. Preferably, the difference in the spectral reflectance between these crystal structures is 5% or greater and more preferably 10% or greater. A large difference in the spectral reflectance permits an easy visual recognition by colors and, hence, provides a remarkable effect in various uses which will be described below.

Rays of visible wavelength region, as well as any electromagnetic waves, can be used as the light to be spectrally reflected. Thus, infrared rays and ultraviolet rays can be used satisfactorily.

The alloy of the invention can reversibly change not only the spectral reflectance but also other properties such as electric resistivity, refractive index, polarization factor, light transmittance and so forth. By virtue of the reversible changes in these properties, the alloy of the invention can be used for recording and regenerating purposes in various uses such as recording device, display, sensors, etc.

The spectral reflectance has a relation to the roughness of the alloy surface. Therefore, the recording region of the alloy material is preferably mirror-finished, in order to attain at least 10% difference of the spectral reflectance.

Uses

The alloy in accordance with the invention exhibits reversible changes in physical and electrical properties such as the spectral reflectance of electromagnetic waves, electric resistivity, refractive index, polarization factor and light transmittance, by virtue of local or whole change of the crystal structure caused by quenching after heating. The alloy of the invention, therefore, can be used for various purposes by making an efficient use of these reversible changes, e.g., as an element for recording, displaying or sensing purpose etc.

When the alloy of the invention is used for the recording purpose, the recording means preferably used is electric energy in the form of voltage or current, or an electromagnetic wave including visible rays, radiated heat, infrared rays, ultraviolet ray, light of photographic flash lamp, electron beam, proton rays, argon laser, semiconductor laser or other laser beams, heat and so forth.

Preferably, the alloy of the invention is used in the form of an optical disk in which the information is recorded by making use of changes in the spectral reflectance occuring by irradiation. The alloy of the invention can be applied to any known optical disks including digital audio disks (DAD or compact disk), video disk, memory disk and display. The optical disk made of the alloy of the invention may be of various types such as read-only type, write-once type and reloadable type. The advantage of the alloy of the invention can be fully enjoyed when the same is applied to the reloadable disk.

The recording medium of the alloy in accordance with the invention can have the form of card or tape.

An explanation will be made hereinunder as to the principle of recording and regeneration in an optical disk as a recording medium made of the alloy of the invention.

The recording medium is locally heated and the heated portion is quenched to a low temperature so that the crystal structure obtained in the high-temperature range is maintained in the low temperature region, thus capable of recording informations. Alternatively, the recording is conducted on the basis of the high-temperature phase by locally maintaining the low-temperature phase in the high-temperature phase by local heating. The information thus recorded can be read by applying a light to the recording portion of the medium and detecting the difference in the optical characteristics between the heated and non-heated portions. The recorded information can be erased as the recording portion of the medium is heated at a temperature which is higher or lower than the recording temperature. The light used in the recording and reading is preferably a laser beam, more preferably a laser beam having comparatively short wavelength. The alloy of the invention exhibits peaks of the difference of reflectance between the heated and non-heated portions at wavelengths around 500 nm and around 800 nm, so that the laser beam used for the reading preferably be of such wavelength. The same laser beam source may be used both for recording and reading. For the erasing, another laser beam having a lower energy density than the recording laser beam is used preferably.

The disk in accordance with the invention offers an additional advantage in that whether the disk already stores an information or not can be known by a simple visual check.

When used for the display purpose, the alloy of the invention can record and visually display letters, patterns and signs without necessitating the use of pair or pigment, because the spectral reflectance of the alloy to visible rays can be varied locally. The recorded information can be erased so that the repetition of recording and erasing, as well as permanent preservation, is possible. Examples of such application for visual display are faces of clocks or watches, accessories and so forth.

The alloy of the invention can be used also as the material of a sensor such as a temperature sensor, by utilizing the change in the spectral reflectance of visible rays. More specifically, in the case of the temperature sensor, a sensor made of the alloy of the invention having the predetermined temperature at which the phase is changed into high-temperature phase, is held in a temperature region to be measured and then supercooled to maintain a supercooled phase. Using this sensor, it is possible to roughly detect the aimed temperature.

Thus, the alloy of the invention has different crystal structures when the same is held at a first temperature above the room temperature or when the same is held at a second temperature lower than the first temperature. In use of the alloy of the invention, at least a portion of the alloy surface is quenched from the first temperature so that the quenched region has a different crystal structure from that obtained regarding the second temperature. This region exhibits a spectral reflectance which is different from that exhibited by other regions, i.e., the region having the crystal structure obtained regarding the second temperature.

Preferably, the quenching from the first temperature is conducted at a rate not smaller than $10^2$° C./sec, more preferably not smaller than $10^3$° C./sec.

EXAMPLES

EXAMPLE 1

Alloys were prepared by adding to an Ag-40 wt % Zn alloy each of Mg, Ti, V, Cr, Fe, Al, Sn and Y independently. The alloys thus prepared were melted in a high-frequency induction furnace to form ingots. The ingots exhibited gold color. The ingots were melted and shaped into ribbons by melt-quenching in two different ways: namely, quenching by pouring it onto the surface of high-speed rotating single roll or quenching by pouring it between a plurality of rolls rotating at high speed. The single roll employed in the first method was a Cu roll having a diameter of 300 mm and plated with Cr, while the rolls used in the second method was Cu-Be alloy rolls each having a diameter of 120 mm. In both cases, the peripheral speeds of the rolls were set at 10 to 20 m/sec. The melting of the alloys was conducted by means of a quartz nozzle. By melting about 10 g of alloy per one charge, ribbon-like foils of 5 mm wide, 40 $\mu$m thick and several meters long were produced. These ribbons exhibited pink color at the room temperature. The ribbons were locally heated at 180° C. so that the heated portions exhibited silver color at the room temperature. The spectral reflectance was measured for these colors.

The difference of spectral reflectance between the pink portion and silver portion was about 15% at the greatest, so that both portions were sufficiently distinguishable from each other. These colors can be preserved substantially permanently. This suggests that information such as signals, letters and signs can be recorded in pink color against the silver color background or, alternatively, in silver color against pink background.

EXAMPLE 2

Reversible change of color was confirmed using thin films which were formed by spatter evaporation deposition method. The spattering targets were formed by discs of 100 mm dia. and 5 mm thick cut out from the ingots prepared in Example 1, while glass sheets of 0.8 mm thick were used as the substrates for the spattering. In order to prevent the oxidation of the spattered film by the heat during writing or erasing, as well as from exfoliation from the substrate, the spattered film was coated by an $SiO_2$ proective film of 30 nm thick which was formed by evaporation deposition. The evaporation deposition for forming the alloy film was carried out by the use of a DC magnetron type device, while the formation of the $SiO_2$ film was conducted by using RF type spattering device. The spattering was conducted with a spattering output of 140 to 200 W, while setting the substrate at the room temperature. The thin film was formed in a vacuum vessel which was evacuated to $10^{-5}$ Torr and then charged with Ar gas up to 5 to 30 mTorr. The film thickness was varied within the range of between 0.05 and 10 $\mu$m, while the $SiO_2$ film thickness was maintained at 30 nm. The alloy film of 300 nm thick formed under the above-described spattering method had ultrafine crystal grains of sizes around 30 nm. It is, therefore, considered that the recording, reading and erasing can be done without being substantially affected by grain size. The alloy film after the evaporation deposition showed pink color.

The alloy films formed by the spattering were heated at 180° C. for 1 minute so that their color was changed into silver color. Then, writing and erasion were conducted by heating and cooling by means of Ar laser beam which was oscillated continuously. The specimens were placed on a manually moving stage with the laser beam being focussed on the film surface, such that the surfaces of the films were scanned with the laser beam. The portions irradiated with the laser beam changed the color into pink, thus accomplishing writing in the shape of an oblique line. The same is also effected in the shape of a spot. The writing was detected as a mark occurring by scanning the film surfaces with the Ar laser beam having a spot diameter of 10 $\mu$m. The alloy films on different substrates had been beforehand subjected to heat treatment so that they originally showed silver color. After the writing, the film surfaces were scanned by the same laser beam which in this case was somewhat out of focus from the film surfaces and, hence, has lower laser power density than that used in the writing. In consequence, the original pink color was erased and changed into silver color. It was thus confirmed that the recording and erasing of information by way of changes in color is possible even when the recording medium has the form of a thin film, and also that the recording and erasing can be repeated for any desired time.

The specimens wholly exhibiting pink color at the room temperature were scanned with Ar laser beam of about 50 W power. The portion scanned by the Ar laser beam changed its color into silver color and, hence, could be clearly distinguished from other portions which were pink, thus proving that the recording is possible.

Thereafter, the specimens were heated at 180° C. for one minute, so that the pink portion changed its color into silver color. Thus, the specimens when cooled down to the room temperature wholly exhibited silver color, proving that the erasing is possible.

EXAMPLE 3

The ingots prepared in Example 1 were crushed into powders and the color tone changes of the powders were examined. Actually, powders were prepared by mechanically cutting the ingot into chips and then crushing the chips into powders. The ingots were generally fragile and the mechanically cut chips were originally fine but these fine chips were further crushed into powders of 100 mesh or so. The powders originally showed silver color but the color was changed into pink as a result of 1-minute heating at 350° C. followed by water cooling.

The powders obtained by crushing the ingots were further pulverized into fine powders having grain sizes of about several micron meters ($\mu$m). The fine powders were applied to glass substrates with the assistance of an organic matter mixed therewith, which powder was then fired in non-oxidizing atmosphere to form alloy films of about 100 $\mu$m thick. An $SiO_2$ film of about 30 nm thick was formed on the surface of each alloy film, by evaporation deposition. The glass substrates had been mirror-finished beforehand and the alloy films also were mirro-polished after the formation. The alloy films thus formed had silver color but the color was changed into pink when heated by a laser beam to a temperature at which the transformation occurs, as in the preceding examples.

EXAMPLE 4

Ag-35 wt % Zn-In alloy was formed into foils by melt-quenching method and changes in color and spectral reflectance were examined. More specifically, an Ag-based starting alloy containing 35 wt % of Zn and 2.8% of In was melted in an argon atmosphere and solidified in the form of bars of 4 mm dia. The bars were then cut into pieces weighing 5 to 10 g and the thus obtained pieces were used as the alloy for melt-quenching.

Figure 3:
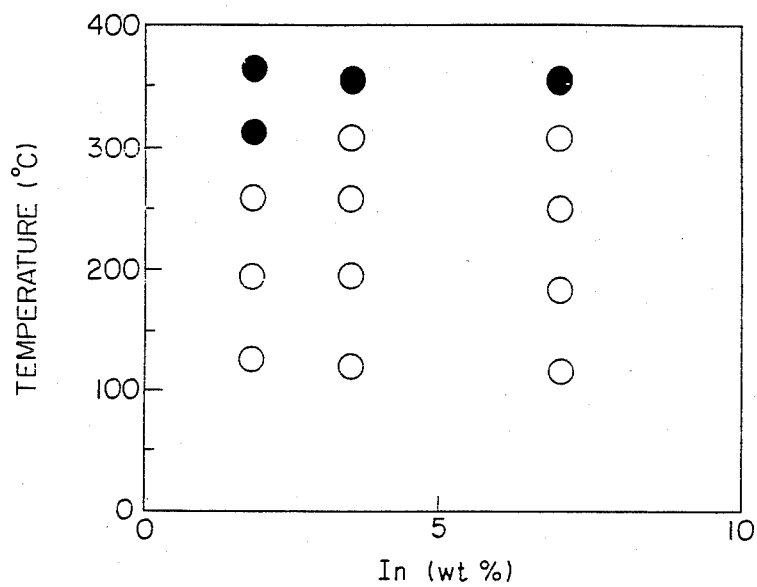
FIGS. 3 and 4 illustrate the change of color in an Ag-Zn-In alloy foil of the invention formed by melt quenching method.

The melt-quenching was conducted by making use of a single-roll type apparatus which is known per se. Namely, the alloy pieces were molten again in a quartz nozzle and the melt was poured onto the outer peripheral surface of a roll (300 mm dia.) rotating at a high speed, so as to form Ag-Zn-In alloy foils of 50 μm thick and 5 mm wide. The foils were heated in an electric oven at varying temperatures for 2 minutes followed by water cooling, and the changes in the color and spectral reflectance were examined. FIG. 3 shows how the color of the foils were changed after heating followed by quenching. The solid circle mark represents pink color, while blank circle shows silver color. It will be seen that the threshold temperature at which the color is changed is about 275° C. in the Ag-35 wt % Zn alloy containing no In and that the threshold temperature becomes higher as the In content in the alloy increases. When the In content exceeds 3.2 wt %, all the specimen changed the color into silver color and, hence, become not distinguishable from one another in the temperature region illustrated.

Figure 4:
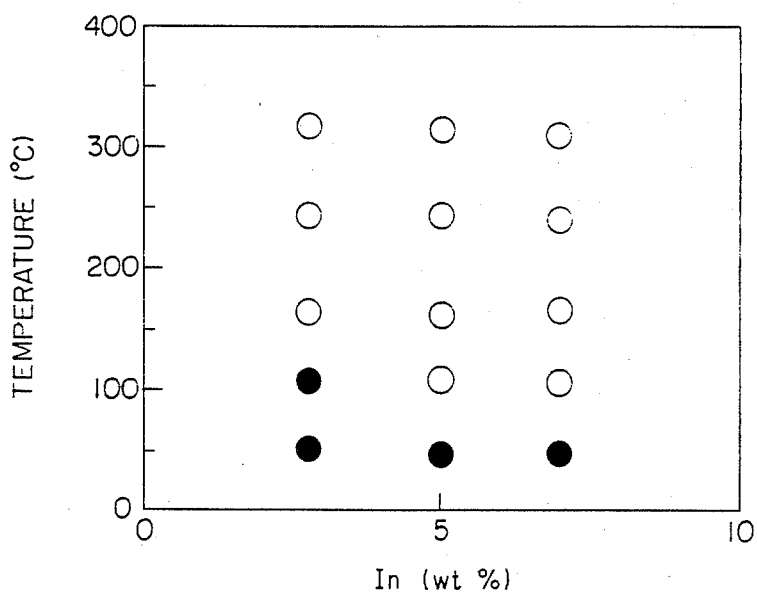

FIG. 4 shows the colors of the foils obtained when the foils which had changed the color into pink were heated at varying temperature below 200° C. for 2 minutes followed by air cooling. The Ag-35 wt % Zn alloy containing no In showed a threshold temperature of about 135° for the color to be changed from pink to silver color. This threshold temperature tends to become lower as the In content is increased. The change of color into pink caused by the quenching from the high temperature is considered as being attributable to the formation and preservation of the $\beta'$ phase, while the color change from pink to silver color is considered as being attributable to a phase change from $\beta'$ phase to $\zeta$ phase.

Figure 5:
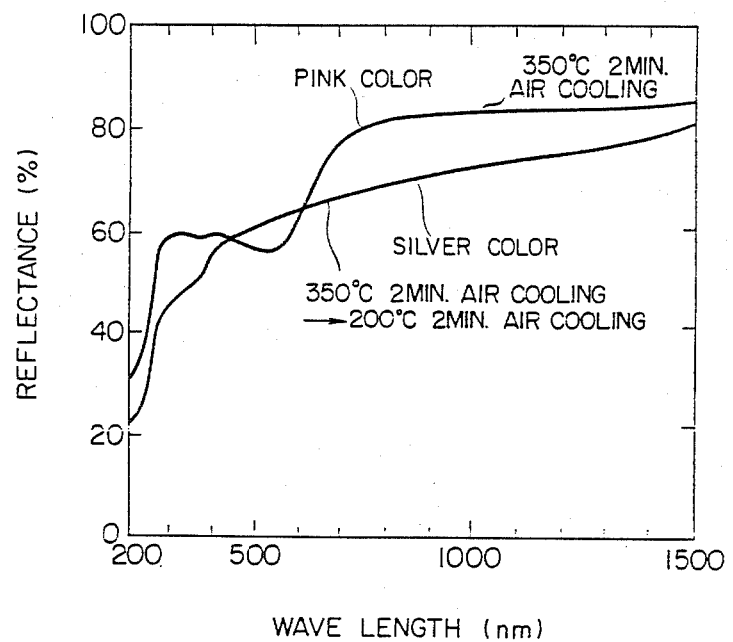
FIG. 5 is a diagram showing the spectral reflectance of an Ag-35% Zn-3.5% In alloy foil when the foil exhibits pink color (2-minutes heating at 350° C. followed by water cooling) and when the foil exhibits silver color (2-minutes heating at 350° C. followed by water cooling and 2-minutes heating at 200° C. followed by air cooling)

FIG. 5 shows the spectral reflectance exhibited by the Ag-35 wt % Zn-3.5 wt % In alloy foil after elapsing 100 hours from heat-treatment for the formation of the alloy. Distinctive difference in reflectance is observed over whole wavelength region of the light except 450 nm and 600 nm. The reversible changes of color between pink and silver colors and consequent reversible changes in the spectral reflectance were stably effected by repetitional heating and cooling at 350° C. and 200° C.

The foil specimen which had been changed into silver color was locally heated by a lighter and then quenched. The heated and quenched portion changed its color into pink, with high distinction from the silver color background. Conversely, a foil of pink color was locally heated and the heated portion of this foil changed its color into silver color.

EXAMPLE 5

An Ag-35 wt % Zn-3.5 wt % In alloy was melted in an argon atmosphere and was solidified into the form of a columnar member of 120 mm in diameter. Disks of 5 mm thick and 100 mm dia. were cut out from the columnar member and used as the targets for spattering.

The spatter evaporation deposition was conducted on hard glass substrates of about 26 mm in diameter and 1.2 mm in thickness using a DC-magnetron type system under the conditions of 200° C. in substrate temperature and 150 mW in the spattering power, so as to form a film of the above-mentioned alloy to a thickness of about 80 nm. The spattering was conducted within the Ar gas atmosphere of 20 m Torr. After the spattering of the alloy film, a protective film of $Al_2O_3$ or $SiO_2$ of about 20 nm in thickness was formed by RF spattering on the film surface.

The film showed silver color in the state after the spattering, but the color was changed into pink as the film was subjected to 2-minute heating at 350° C. followed by water cooling together with the substrate. The film was then subjected to 2-minute heating at 200° C. followed by cooling, so that the color was changed again to silver color. Thus, the film formed by spattering showed the same tendency of color change as the foil mentioned before.

EXAMPLE 6

Operations for recording, regenerating and erasing information are conducted by means of laser beams while using a film of Ag-35 wt % Zn-3.5 wt % In formed by spattering in the same way as the Example 5. A semiconductor laser (wavelength of 830 nm) or an Ar laser (wavelength of 488 nm) was used as the laser beam. The film was scanned with the laser beam while both the power of the laser beam and the beam diameter on the film surface were changed between 10 and 50 mW and between 1 and 10 μm, respectively, with the result that lines of pink color were formed in the film surface as a result of the scanning. The line width was changed between about 1 and 20 μm in accordance with the laser power. After forming a plurality of such lines, the film was scanned with the semiconductor laser beam transversely of the lines. The change in the spectral reflectance occurring when the scanning laser beam travels across the line was detected electrically as a change in D.C. voltage in the order of about 20%. Thus, the change in color was successfully changed into electric signal.

The thus scribed pink lines could be erased and the initial silver color was resumed by heating the whole fim up to 200° C. or so or by scanning the lines with laser beam of a lower power density than the prior scanning laser beam.

EXAMPLE 7

Ag-35 wt % Zn-Cu alloys were formed into foils by melt-quenching method and changes in color and spectral reflectance were examined. More specifically, Ag-based starting alloy containing 35 wt % of Zn and 0 to 2.5 wt % of Cu were melted in an argon atmosphere and solidified in the form of bars of 4 mm dia. The bars were then cut into pieces weighing 5 to 10 g and the thus obtained pieces were used as the alloy for melt-quenching.

Figure 6:
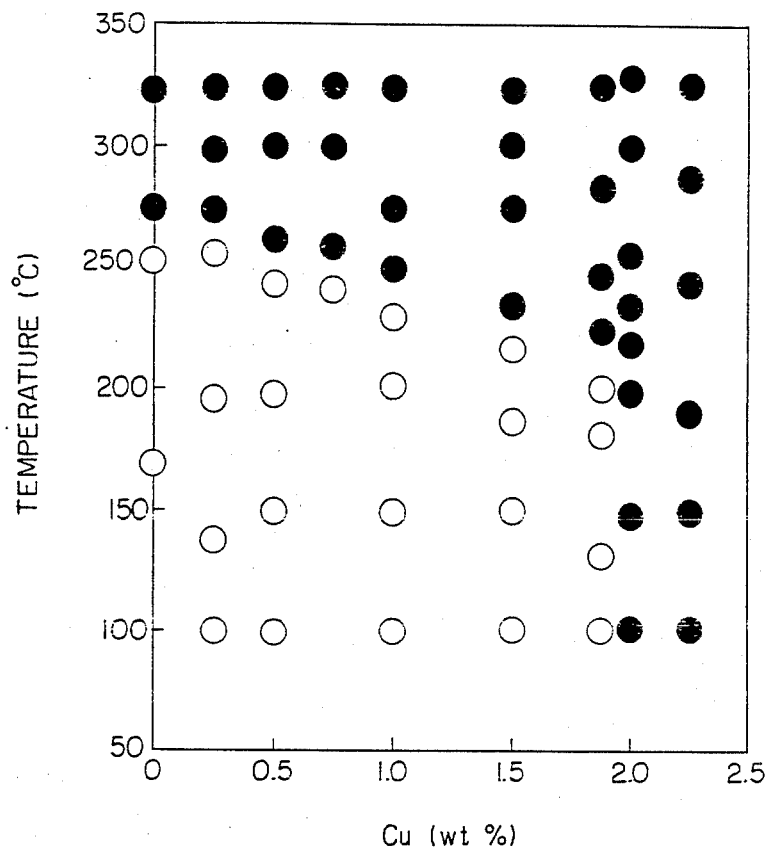
FIGS. 6 and 7 show the change in the color caused by a heat treatment of a melt-quenched Ag-Zn-Cu alloy foil of the invention.
Figure 7:
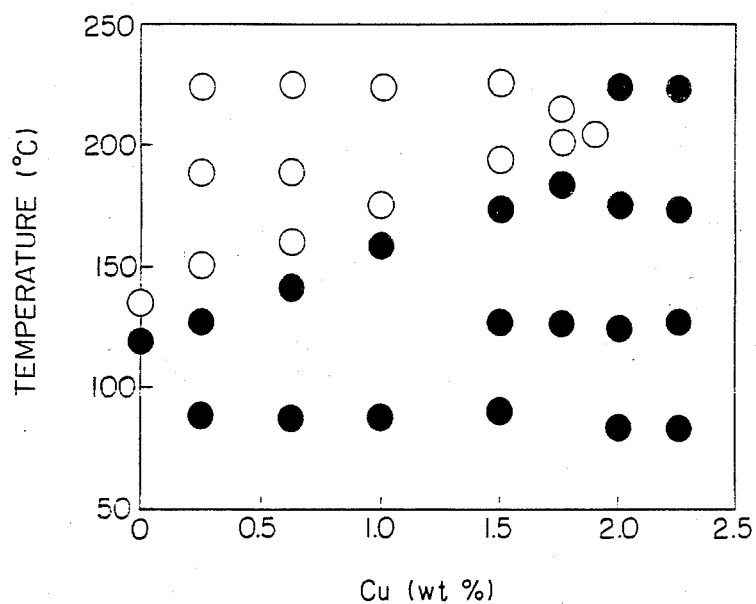

The melt-quenching was conducted by making use of a single-roll type apparatus which is known per se. Namely, the alloy pieces were melted again in a quartz nozzle and the melt was poured onto the outer peripheral surface of a roll (300 mm dia.) rotating at a high speed, so as to form Ag-Zn-Cu alloy foils of 50 μm thick and 5 mm wide. The foils were heated in an electric oven at varying temperatures for 2 minutes followed by water cooling, and the changes in the color and spectral reflectance were examined. FIG. 6 shows how the color of the foils were changed after heating followed by quenching. The solid circle mark represents pink color, while blank circle shows silver color. It will be seen that the threshold temperature at which the color is changed is about 275° C. in the Ag-35 wt % Zn alloy containing no Cu and that the threshold temperature becomes lower as the Cu content of the alloy is increased. When the Cu content exceeds 2 wt %, all the specimen changed the color into pink and, hence, became undistinguishable from one another in the temperature region illustrated. The Cu content is preferably not greater than 1.8 wt %. FIG. 7 shows the colors of the foils obtained when the foils which had changed the color into pink were heated at vartying temperature below 350° C. for 2 minutes followed by air cooling. In all cases, the color was changed from pink to silver color at temperatures below 200° C. This threshold temperature tends to become higher as the Cu content is increased. The change of color into pink cuased by the quenching from the high temperature is considered as being attributable to the formation and preservation of the $\beta'$ phase while the color change from pink to silver color is considered as being attributable to a phase change from $\beta'$ phase to $\zeta$ phase.

Figure 8:
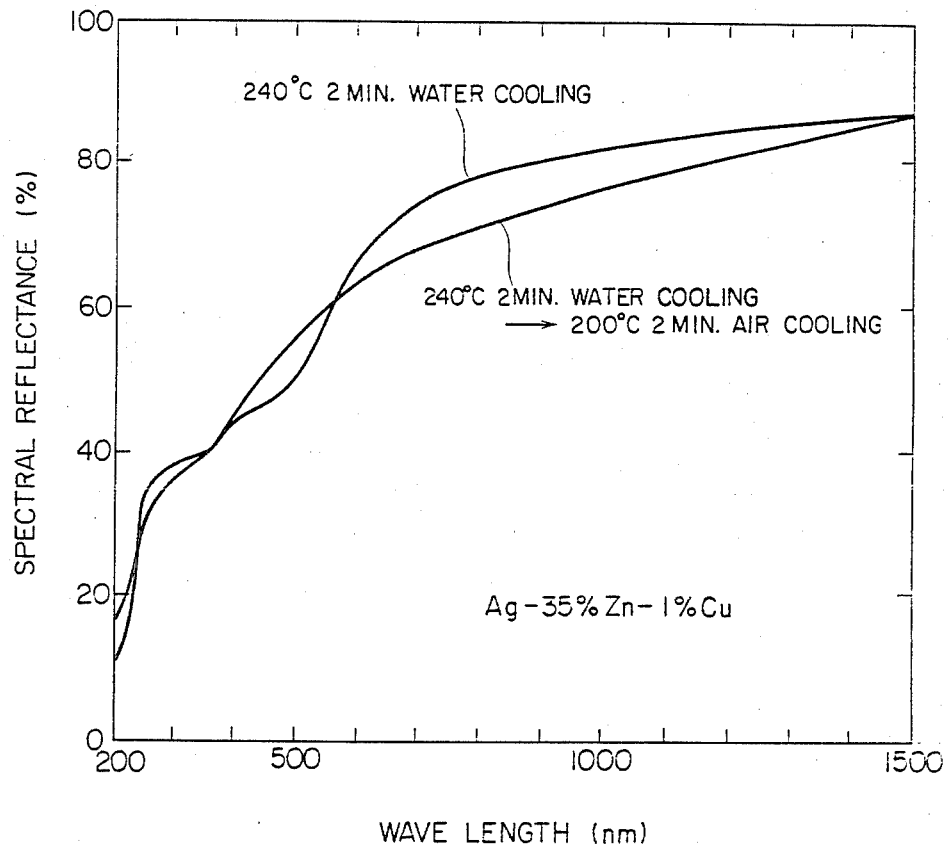
FIG. 8 is a diagram showing the spectral reflectance of an Ag-35% Zn-1% Cu alloy foil when the foil exhibits pink color (2-minutes heating at 240° C. followed by water cooling) and when the foil exhibits silver color (2-minutes heating at 240° C. followed by water cooling and 2-minutes heating at 200° C. followed by air cooling)

FIG. 8 shows the spectral reflectance exhibited by the Ag-35 wt % Zn-1 wt % Cu alloy foil. Distinctive difference in reflectance is observed over whole wavelength region of the light except the range between 530 nm and 600 nm. The reversible changes of color between pink and silver color are consequent reversible changes in the spectral reflectance were stably effected by repetitional heating and cooling at 240° C. and 200° C.

The foil specimen which had been changed into silver color was locally heated by a lighter and then quenched. The heated and quenched portion changed its color into pink, with high distinction from the silver color background. Conversely, a foil of pink color was locally heated and the heated portion of this foil changed its color into silver color.

EXAMPLE 8

An An-35 wt % Zn-1 wt % Cu alloy was melted in an argon atmosphere and was solidified into the form of a columnar member of 120 mm diameter. Disks of 5 mm thick and 100 mm dia. were cut out from the columnar member and used as the targets for spattering.

The spatter evaporation deposition was conducted on hard glass substrates of about 26 mm in diameter and 1.2 mm in thickness using a DC-magnetron type system under the conditions of 200° C. in substate temperature and 150 mW in the spattering power, so as to form a film of the above-mentioned alloy to a thickness of about 80 nm. The spattering was conducted within the Ar gas atmosphere of 20 mTorr. After the spattering of the alloy film, a protective film of $Al_2O_3$ or $SiO_3$ was formed by RF spattering on the film surface to a thickness of about 20 nm.

The film showed silver color in the state after the spattering, but the color was changed into pink as the film was subjected to 2-minute heating at 240° C. followed by water cooling together with the substrate. The film was then subjected to 2-minute heating at 200° C. followed by water cooling, so that the color was changed again to silver color. Thus, the film formed by spattering showed the same tendency of color change as the foil mentioned before.

EXAMPLE 9

Operations for recording, regenerating and erasing information were conducted by means of laser beams while using a film of Ag-35 wt % Zn-1 wt % Cu formed by spattering in the same way as in the Example 8. A semiconductor laser (wavelength of 830 nm) or an Ar laser (wavelength of 488 nm) was used as the laser beam. The film was scanned with the laser beam while both the power of the laser beam and the beam diameter on the film surface were changed between 10 and 50 mW and between 1 and 10 $\mu$m respectively, so that lines of pink color were formed in the film surface as a result of the scanning. The line width was changed between about 1 and 20 $\mu$m in accordance with the laser power. After forming a plurality of such lines, the film was scanned with the semiconductor laser beam transversely of the lines. The change in the spectral reflectance having occurred when the scanning laser beam traveled across the line was detected electrically as a change in D.C. voltage in the order of about 20%. Thus, the change in color was successfully changed into electric signal.

The thus scribed pink lines could be erased and the initial silver color was resumed by heating the whole film up to 200° C. or so or by scanning the lines with laser beam of a lower power density than the prior scanning laser beam.

EXAMPLE 10

Ag-35 wt % Zn-Sm alloys were formed into foils by melt-quenching method and changes in color and spectral reflectance were examined. More specifically, Ag-based starting alloys containing 35 wt % of Zn and 0.5 to 8.0 wt % of Sm were melted in an argon atmosphere and solidified in the form of bars of 4 mm dia. The bars were then cut into pieces weighing 5 to 10 g and the thus obtained pieces were used as the alloy for melt-quenching.

Figure 9:
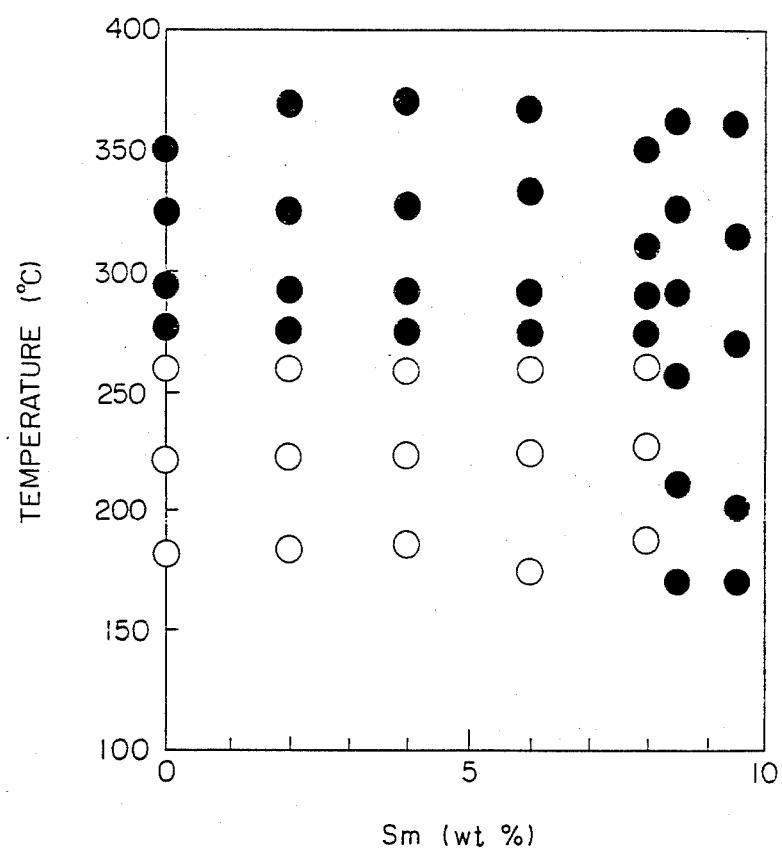
FIGS. 9 and 10 show the change in the color caused by a heat treatment in a melt-quenched Ag-Zn-Sm alloy foil of the invention.

The melt-quenching was conducted by making use of a single-roll type apparatus which is known per se. Namely, the alloy pieces were melted again in a quartz nozzle and the melt was poured onto the outer peripheral surface of a roll (300 mm dia.) rotating at a high speed, so as to form Ag-Zn-Sm alloy foils of 50 $\mu$m thick and 5 mm wide. The foils were heated in an electric oven at varying temperatures for 2 minutes followed by water cooling, and the changes in the color and spectral reflectance were examined. FIG. 9 shows how the color of the foils were changed after heating followed by quenching. The solid circle mark represents pink color, while blank circle shows gold color. The discrimination was possible until the Sm content was increased up to 8.0 wt %. However, when the Sm content exceeds 8.2 wt %, all the specimens changed the color into gold and, hence, became undistinguishable from one another in the temperature region illustrated.

Figure 10:
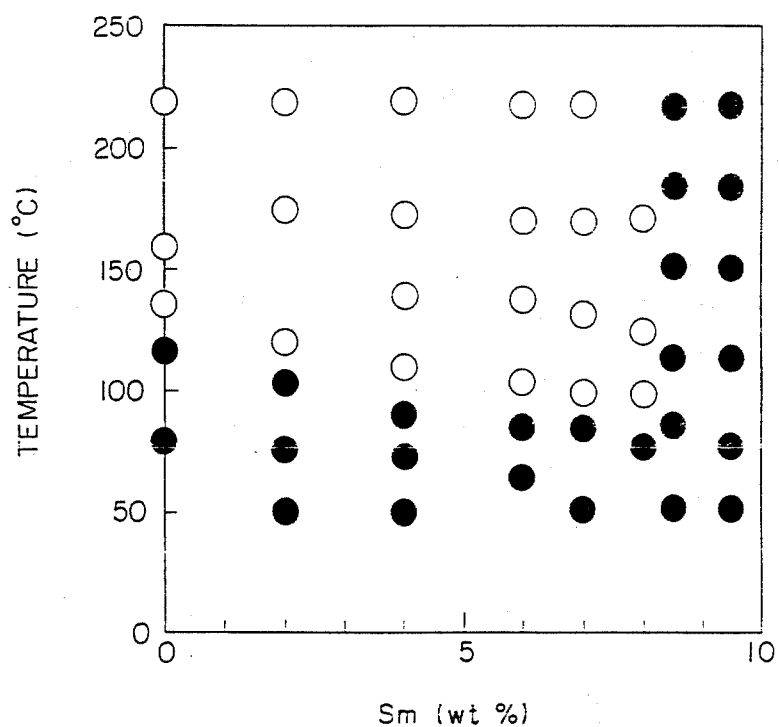

FIG. 10 shows the colors of the foils obtained when the foils which had changed the color into pink were heated at varying temperature below 250° C. for 2 minutes followed by air cooling. The Ag-35 wt % Zn alloy containing no Sm showed a threshold temperature of about 130° for the color to be changed from pink to silver color. This threshold temperature tends to become lower as the Sm content is increased. The $\zeta$ phase of Ag-Zn alloy originally exhibits silver color but the color is changed to gold by addition of Sm. The change of color into pink caused by the quenching from the high temperature is considered as being attributable to the formation and preservation of the $\beta'$ phase, while the color change from pink to gold is considered as being attributable to a phase change from $\beta'$ phase to $\zeta$ phase.

Figure 11:
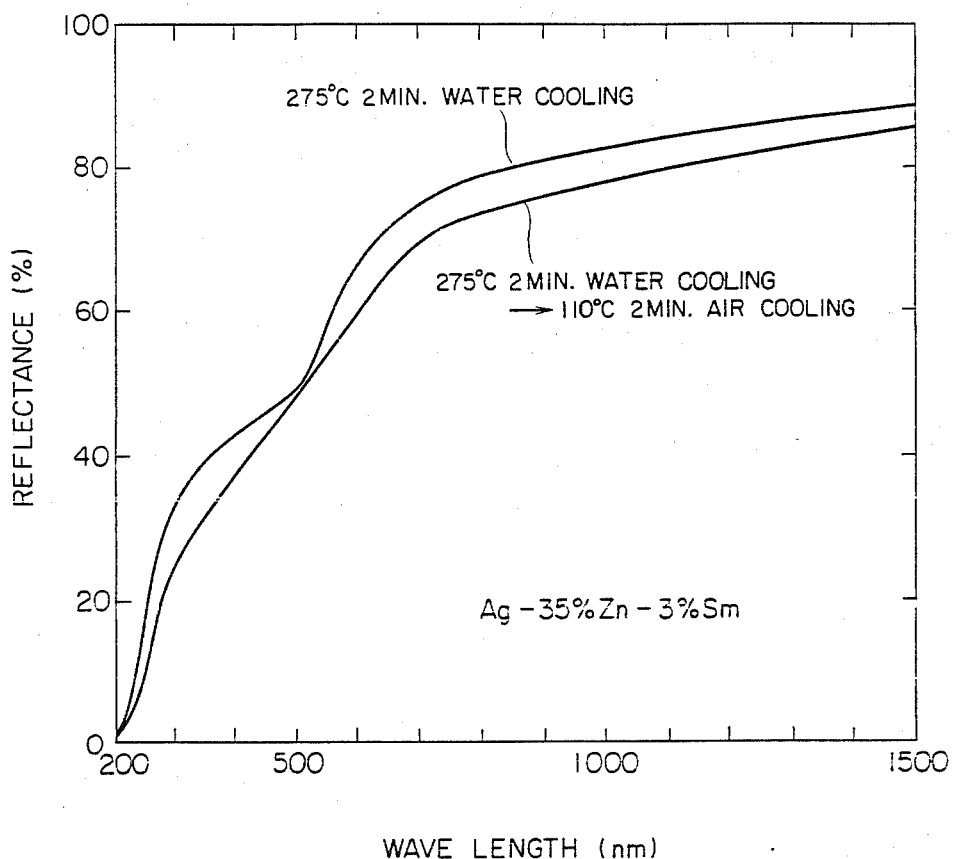
FIG. 11 is a diagram showing the spectral reflectance of an Ag-35% Zn-3 % Sm alloy foil when the foil exhibits pink color (2- minutes heating at 275° C. followed by water cooling) and when the foil exhibits gold color (2-minutes heating at 275° C. followed by water cooling and 2-minutes heating at 110° C. followed by air cooling)

FIG. 11 shows the spectral reflectance exhibited by the Ag-35 wt % Zn-3 wt % Sm alloy foil. Distinctive difference in reflectance is observed over whole wavelength region of the light except the range between 350 nm and 550 nm. The reversible changes of color between pink and gold and consequent reversible changes in the spectral reflectance were stably effected by repetitional heating and cooling at 275° C. and 110° C.

The foil specimen which had been changed into gold color was locally heated by a lighter and then quenched. The heated and quenched portion changed its color into pink, with high distinction from the gold color background. Conversely, a foil of pink color was locally heated and the heated portion of this foil changed its color into gold.

EXAMPLE 11

An Ag-35 wt % Zn-3 wt % Sm alloy was melted in an argon atmosphere and was solidified into the form of a columnar member of 120 mm diameter. Disks of 5 mm thick and 100 mm dia. were cut out from the columnar member and used as the targets for spattering.

The spatter evaporation deposition was conducted on hard glass substrates of about 26 mm in diameter and 1.2 mm in thickness using a DC-magnetron type system under the conditions of 200° C. in substrate temperature and 150 mW in the spattering power, so as to form a film of the above-mentioned alloy to a thickness of about 80 nm. The spattering was conducted within the Ar gas atmosphere of 20 mTorr. After the formation of the alloy film, a protective film of $Al_2O_3$ or $SiO_2$ was formed by RF spattering on the film surface to a thickness of about 20 nm.

The film showed gold color in the state after the spattering, but the color was changed into pink as the film was subjected to 2-minute hating at 275° C. followed by water cooling together with the substrate. The film was then subjected to 2-minute heating at 110° C. followed by water cooling, so that the color was changed again to silver color. Thus, the film formed by spattering showed the same tendency of color change as the foil mentioned before.

EXAMPLE 12

Operations for recording, regenerating and erasing information were conducted by means of laser beams using a film of Ag-35 wt % Zn-3 wt % Sm formed by spattering in the same way as the Example 11. A semiconductor laser (wavelength of 830 nm) or an Ar laser (wavelength of 488 nm) was used as the laser beam. The film of silver color was scanned with the laser beam while both the power of the laser beam and the beam diameter on the film surface were changed between 10 and 50 mW and between 1 and 10 $\mu$m respectively, so that lines of pink color were formed in the film surface as a result of the scanning. The line width was changed between about 1 and 20 $\mu$m in accordance with the laser power. After forming a plurality of such lines, the film was scanned with the semiconductor laser beam transversely of the lines. The change in the spectral reflectance occurred when the scanning laser beam travels across the line was detected electrically as a change in D.C. voltage in the order of about 20%. Thus, the change in color was successfully changed into electric signal.

The thus scribed pink lines could be erased and the initial silver color was resumed by heating the whole film up to 220° C. or so by scanning the lines with laser beam of a lower power density than the prior scanning laser beam.

EXAMPLE 13

Ag-35 wt % Zn-Ga alloys were formed into foils by melt-quenching method and changes in color and spectral reflectance were examined. More specifically, Ag-based starting alloy containing 35 wt % of Z and 0.1 to 4.0 wt % of Ga was melted in an argon atmosphere and solidified in the form of bars of 4 mm dia. The bats were cut into pieces weighing 5 to 10 g and the thus obtained pieces were used as the alloy for melt-quenching.

Figure 12:
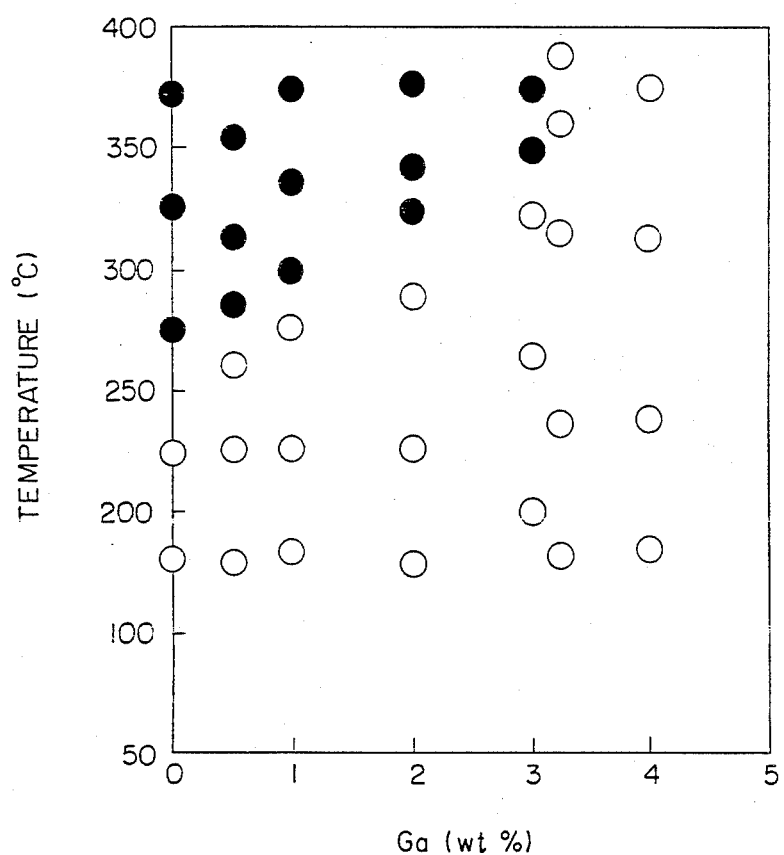
FIGS. 12 and 13 show the change in the color caused by a heat treatment in a melt-quenched Ag-Zn-Ga alloy foil of the invention.

The melt quenching was conducted by making use of a single-roll type apparatus which is known per se. Namely, the alloy pieces were melted again in a quartz nozzle and the melt was poured onto the outer peripheral surface of a roll (300 mm dia.) rotating at a high speed, so as to form Ag-Zn-Ga alloy foils of 50 $\mu$m thick and 5 mm wide. The foils were heated in an electric oven at varying temperatures for 2 minutes followed by water cooling, and the changes in the color and spectral reflectance were examined. FIG. 12 shows how the color of the foils were changed after heating followed by quenching. The solid circle mark represents pink color, while blank circle shows silver color. It will be seen that the threshold temperature at which the color is changed is about 275° C. in the Ag-35 wt % Zn alloy containing no Ga and that the threshold temperature becomes higher as the Ga content of the alloy is increased. When the Ga content exceeds 3.2 wt %, all the specimen changed the color into silver and, hence, became undistinguishable from one another in the temperature region illustrated.

Figure 13:
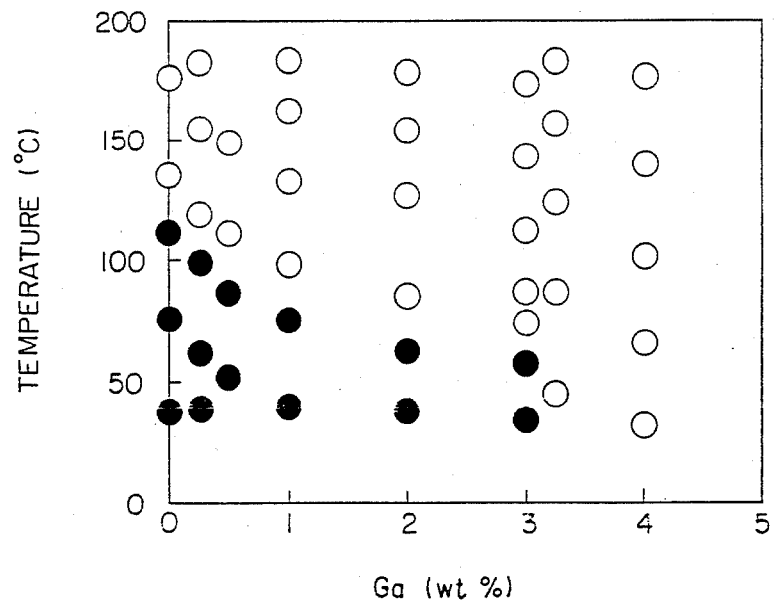

FIG. 13 shows the colors of the foils obtained when the foils which had changed the color into pink were heated at varying temperature below 200° C. for 2 minutes followed by air cooling. The Ag-35 wt % Zn alloy containing no Ga showed a threshold temperature of about 135° for the color to be changed from pink to silver color. This threshold temperature tends to become lower as the Ga content is increased. The change of color into pink caused by the quenching from the high temperature is cosidered as being attributable to the formation and preservation of the $\beta'$ phase, while the color change from pink to silver is considered as being attributable to a phase change from $\beta'$ phase to $\zeta$ phase.

Figure 14:
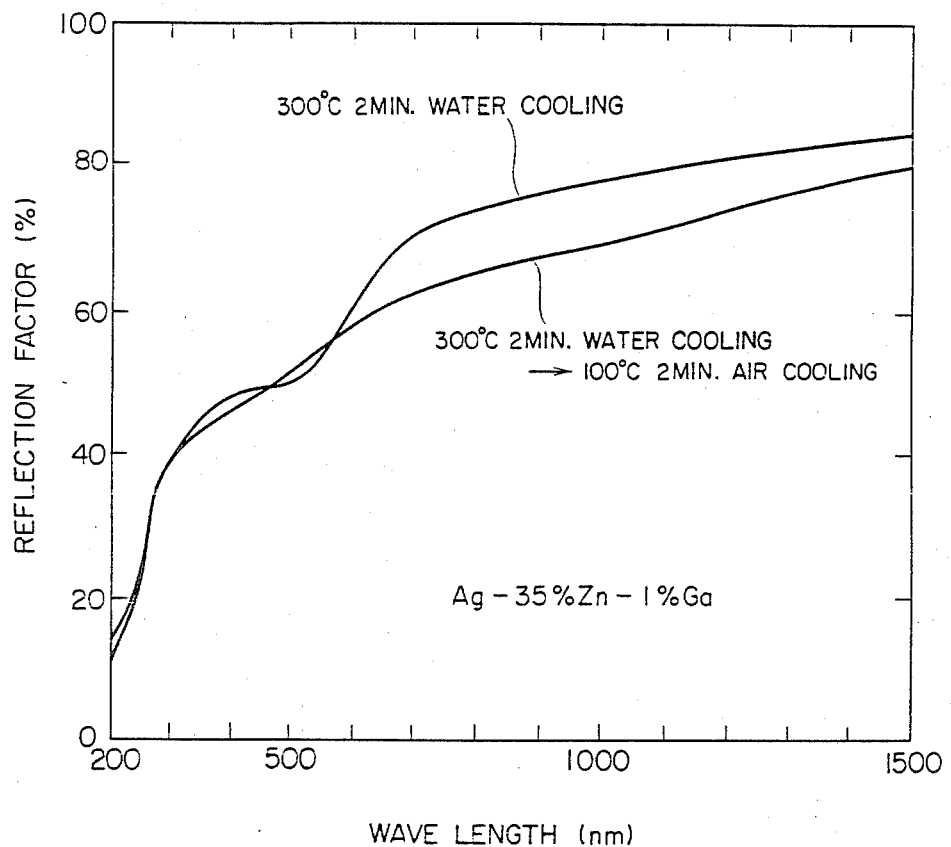
FIG. 14 is a diagram showing the spectral reflectance of an Ag-35% Zn-1 % Ga alloy foil when the foil exhibits pink color (2-minutes heating at 300° C. followed by water cooling) and when the foil exhibits silver color (2-minute heating at 300° C. followed by water cooling and 2-minute heating at 100° C. followed by air cooling).

FIG. 14 shows the spectral reflectance exhibited by the Ag-35 wt % Zn-1 wt % Ga alloy foil. Distinctive difference in reflectivity is observed over whole wavelength region of the light except the range between 400 nm and 600 nm. The reversible changes of color between pink and silver and consequent reversible changes in the spectral reflectance were stably effected by repetitional heating and cooling at 300° C. and 100° C.

The foil specimen which had been changed into silver color was locally heated by a lighter and then quenched. The heated and quenched portion changed its colors into pink, with high distinction from the silver color background. Conversely, a foil of pink color was locally heated and the heated portion of this foil changed its color into silver color.

EXAMPLE 14

An Ag-35 wt % Zn-1 wt % Ga alloy was melted in an argon atmosphere and was solidified into the form of a columnar member of 120 mm diameter. Disks of 5 mm thick and 100 mm dia. were cut out from the columnar member and used as the targets for spattering.

The spatter evaporation deposition was conducted on hard glass substrates of about 26 mm in diameter and 1.2 mm in thickness using a DC-magnetron type system under the conditions of 200° C. in substrate temperature and 150 mW in the spattering power, so as to form a film of the above-mentioned alloy to a thickness of about 80 nm. The spattering was conducted within the Ar gas atmosphere of 20 mTorr. After the formation of the alloy film, a protective film of $Al_2O_3$ or $SiO_2$ was formed by RF spattering on the film surface to a thickness of about 20 nm.

The film showed silver color in the state after the spattering, but the color was changed into pink as the film was subjected to 2-minute heating at 300° C. followed by water cooling together with the substrate. The film was then subjected to 2-minute heating at 100° C. followed by water cooling, so that the color was changed again to silver color. Thus, the film formed by spattering showed the same tendency of color change as the foil mentioned before.

EXAMPLE 15

Operations for recording, regenerating and erasing informations were conducted by means of laser beams using a film of Ag-35 wt % Zn-1 wt % Ga formed by spattering in the same way as the Example 14. A semiconductor laser (wavelength of 830 nm) or an Ar laser (wavelength of 488 nm) was used as the laser beam. The film was scanned with the laser beam while both the power of the laser beam and the beam diameter on the film surface were changed between 10 and 50 mW and between 1 and 10 μm respectively, so that lines of pink color were formed in the film surface as a result of the scanning. The line width was changed between about 1 and 20 μm in accordance with the laser power. After forming a plurality of such lines, the film was scanned with the semiconductor laser beam transversely of the lines. The change in the spectral reflectance occurred when the scanning laser beam travels across the line was detected electrically as a change in D.C. voltage on the order of about 20%. Thus, the change in color was successfully changed into electric signal.

The thus scribed pink lines could be erased and the initial silver color was resumed easily by heating the whole film up to 200° C. or so by scanning the lines with laser beam of a lower power density than the prior scanning laser beam.

As will be fully realized from the foregoing description, the alloy and the recording medium of the invention exhibits reversible change in the color and spectral reflectance due to a phase change between different crystal phases, so that they can be used suitably as recording materials which permit recording and erasing of information.

What is claimed is:

1. An information recording medium made of an alloy with variable spectral reflectance having a composition which consists essentially of 30 to 46 wt % of Zn, not greater than 15 wt % in total of at least one element selected from the group consisting of Mg, Ti, V, Cr, Fe, Al, Sn, Y, In, Cu, Sm and Ga, and the balance Ag and incidental impurities, said alloy being able to have different crystal structures at room temperature, one of said different crystal structures being obtained at room temperature after being held in the solid state at a first temperature above the room temperature, and another of said different crystal structures being obtained at room temperature after being held in the solid state at a second temperature lower than said first temperature.

2. An information recording medium according to claim 1, wherein said alloy has a composition which consists essentially of 30 to 46 wt % of Zn, not greater than 10 wt % of In, and the balance Ag and incidental impurities.

3. An information recording medium according to claim 1, wherein said alloy has a composition which consists essentially of 30 to 46 wt % of Zn, 0.5 to 2.0 wt % of Cu, and the balance Ag and incidental impurities.

4. An information recording medium according to claim 1, wherein said alloy has a composition which consists essentially of 30 to 46 wt % of Zn, 0.1 to 3.0 wt % of Ga, and the balance of Ag and incidental impurities.

5. An information recording medium according to claim 11, wherein said alloy has the form of a thin film, foil, strip, powder or thin wire.

6. An information recording medium according to claim 1, wherein said composition consists essentially of 30 to 46 wt % of Zn, 0.1 to 15 wt % total of at least one element selected from the group consisting of Mg, Ti, V, Cr, Fe, Al, Sn, Y, In, Cu, Sm and Ga, and the balance Ag and incidental impurities.

7. An information recording medium according to claim 1 wherein said alloy has a crystal grain size not greater than 0.1 μm.

8. An information recording medium according to claim 1 wherein said alloy has a composition which consists essentially of 30 to 46 wt % of Zn, 0.5 to 8.0 wt % of Sm, and the balance Ag and incidental impurities.

* * * * *